(12) United States Patent
    Takeichi

(10) Patent No.: US 7,500,315 B2
(45) Date of Patent: Mar. 10, 2009

(54) HOLE DATA INPUT DEVICE AND EYEGLASS LENS PROCESSING APPARATUS HAVING THE SAME

(75) Inventor: Kyoji Takeichi, Gamagori (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/711,695

(22) Filed: Feb. 28, 2007

(65) Prior Publication Data

US 2007/0201002 A1    Aug. 30, 2007

(30) Foreign Application Priority Data

Feb. 28, 2006    (JP)    ............... P.2006-054186

(51) Int. Cl.
    *B43L 9/00*    (2006.01)
(52) U.S. Cl. ............................. 33/28; 33/507
(58) Field of Classification Search ............ 33/28, 33/200, 507, 613, 645
    See application file for complete search history.

(56) References Cited

U.S. PATENT DOCUMENTS

| 4,817,024 | A | * | 3/1989 | Saigoh ................. 33/507 |
| 4,979,311 | A | * | 12/1990 | Bizer et al. ............ 33/507 |
| 5,152,067 | A | * | 10/1992 | Kurachi et al. ......... 33/200 |
| RE35,898 | E | | 9/1998 | Shibata et al. |
| 6,325,700 | B1 | | 12/2001 | Mizuno et al. |
| 6,790,124 | B2 | | 9/2004 | Shibata |
| 2006/0178086 | A1 | | 8/2006 | Shibata |

FOREIGN PATENT DOCUMENTS

| EP | 1310327 A2 | 5/2003 |
| FR | 2863189 A1 | 6/2005 |

* cited by examiner

*Primary Examiner*—G. Bradley Bennett
(74) *Attorney, Agent, or Firm*—Sughrue Mion, PLLC

(57) ABSTRACT

A hole data input device for inputting hole data including a position of a hole with respect to a target lens shape for forming the hole on an eyeglass lens to attach a rimless frame to the lens, includes: a storage that stores plural types of hole patterns; a selector that selects a desired hole pattern from the stored hole patterns; and a setting unit that automatically sets at least one of positions, diameters, depths, and angles of plural holes based on the selected hole pattern.

10 Claims, 12 Drawing Sheets

HOLE DATA INPUT DEVICE AND EYEGLASS LENS PROCESSING APPARATUS HAVING THE SAME

BACKGROUND OF THE INVENTION

The present invention relates to a hole data input device for inputting hole data including a position of a hole with respect to a target lens shape for forming the hole on an eyeglass lens to attach a rimless frame to the lens and an eyeglass lens processing apparatus having the same.

There has been an eyeglass lens processing apparatus comprising a drilling mechanism for forming a hole on an eyeglass lens to attach a rimless frame such as a two-point frame to the lens by a drilling tool such as an end mill or a drill. In the apparatus, hole data including a position, a diameter, a depth, and an angle (a direction) of a hole for obtaining drilling data is input.

However, one hole may be formed at both of a nose side and an ear side of one lens, or plural holes may be formed at any one or both of the nose side and the ear side of one lens, since plural holes are generally formed on one lens, it is troublesome to input hole data for each hole.

SUMMARY OF THE INVENTION

The invention has a technical object to provide a hole data input device which can carry out an inputting operation of hole data efficiently and an eyeglass lens processing apparatus having the same.

The invention has a feature to have the following structure in order to solve the problems.

(1) A hole data input device for inputting hole data including a position of a hole with respect to a target lens shape for forming the hole on an eyeglass lens to attach a rimless frame to the lens, the hole data input device comprising:
 a storage that stores plural types of hole patterns;
 a selector that selects a desired hole pattern from the stored hole patterns; and
 a setting unit that automatically sets at least one of positions, diameters, depths, and angles of plural holes based on the selected hole pattern.

(2) The hole data input device according to (1), further comprising a hole position input unit that designates a reference position of the positions of the plural holes,
 wherein the setting unit automatically sets the positions of the plural holes based on the selected hole pattern and the designated reference position.

(3) The hole data input device according to (2), wherein the hole position input unit designates a position of one hole among the plural holes as the reference position.

(4) The hole data input device according to (2), further comprising a pointing device having a display for displaying a graphic indicating the target lens shape,
 wherein the selector selects an icon of the desired hole pattern from icons of the stored hole patterns, which are displayed on the display, and
 wherein the hole position input unit designates the reference position by moving the selected icon onto the target lens shape graphic.

(5) The hole data input device according to (2) further comprising a hole interval input unit that inputs an interval between two holes among the plural holes,
 wherein the setting unit automatically sets a position of the other hole based on the selected hole pattern, the designated reference position, and the input hole interval.

(6) The hole data input device according to (1) further comprising a hole diameter input unit that inputs a diameter of one hole among the plural holes,
 wherein the setting unit automatically sets a diameter of the other hole based on the selected hole pattern and the input hole diameter.

(7) The hole data input device according to (1) further comprising a hole depth input unit that inputs a depth of one hole among the plural holes,
 wherein the setting unit automatically sets a depth of the other hole based on the selected hole pattern and the input hole depth.

(8) The hole data input device according to (1) further comprising a hole angle input unit that inputs an angle of one hole among the plural holes,
 Wherein the setting unit automatically sets an angle of the other hole based on the selected hole pattern and the input hole angle.

(9) The hole data input device according to (1), wherein the setting unit automatically sets at least one of the positions, diameters, depths, and angles of four holes when a hole pattern in which two holes are formed at each of a nose side and an ear side of the lens in attaching the frame to the lens is selected.

(10) An eyeglass processing apparatus having the hole data input device according to (1), the eyeglass processing apparatus comprising:
 a lens chuck holding the lens;
 a drilling tool; and
 an arithmetic control portion executing a drilling of the lens by obtaining drilling data based on input hole data and controlling a positional relationship between the held lens and the drilling tool based on the obtained drilling data.

DESCRIPTION OF PREFERRED EMBODIMENTS

Figure 1:
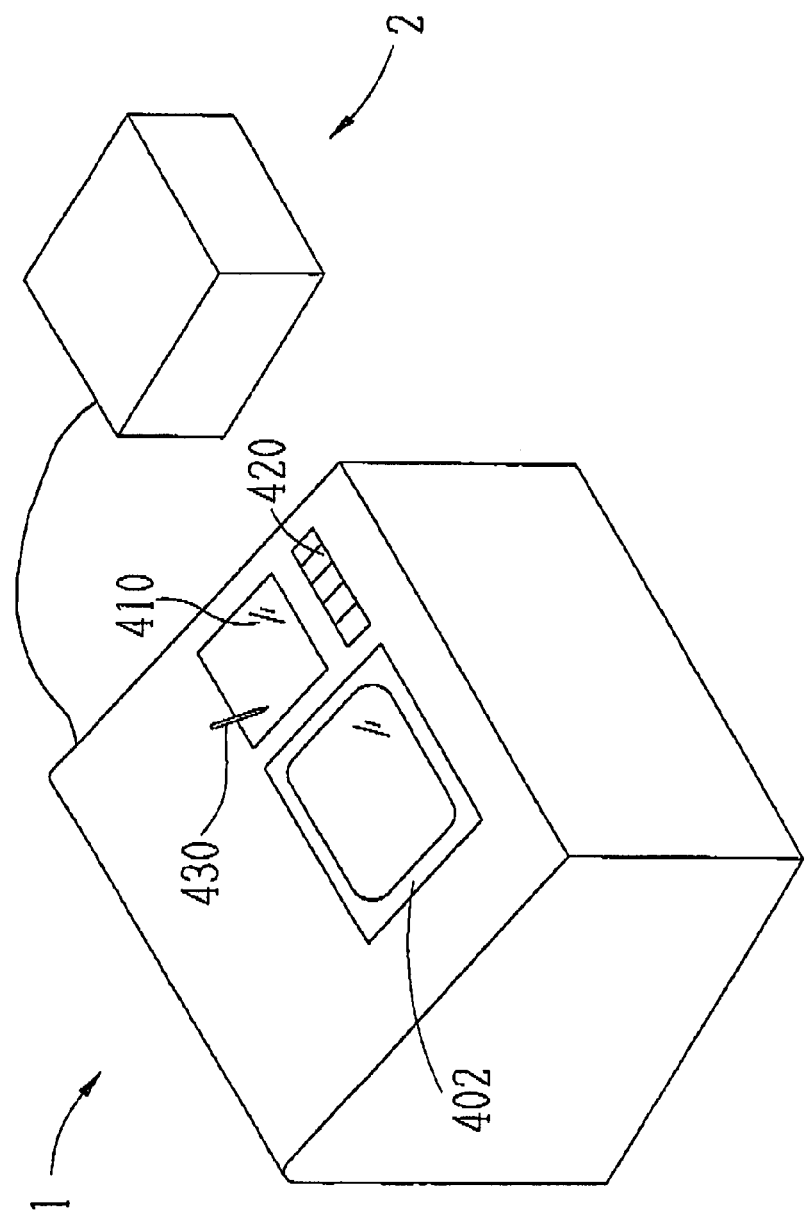
FIG. 1 is a schematic view showing an appearance of an eyeglass lens processing apparatus according to an embodiment of the invention.

Hereinafter, an embodiment of the invention will be described below with reference to the drawings. FIG. 1 is a schematic view showing an appearance of an eyeglass lens processing apparatus according to an embodiment of the invention. An eyeglass frame measuring device 2 is connected to an eyeglass lens processing apparatus 1. For the measuring device 2, it is possible to use a device described in U.S. Re. 35898 (JP-A-5-212661) and U.S. Pat. No. 6,325,700 B (JP-A-2000-314617). An upper part of the processing apparatus 1 is provided with a touch panel 410 serving as a display portion (display means) for displaying processing information and an input portion (input means and selecting means) for inputting processing conditions, and a switch portion 420 having a switch for giving an instruction for a processing, for example, a processing start switch. The touch panel 410 serves as a pointing device in which an input operation is performed on a display screen by a stylus pen 430, an operator's finger, or the like, and includes a hole data input device. A lens to be processed is processed in a processing chamber in an opening window 402. The processing apparatus 1 may be integrated with the measuring device 2.

Figure 2:
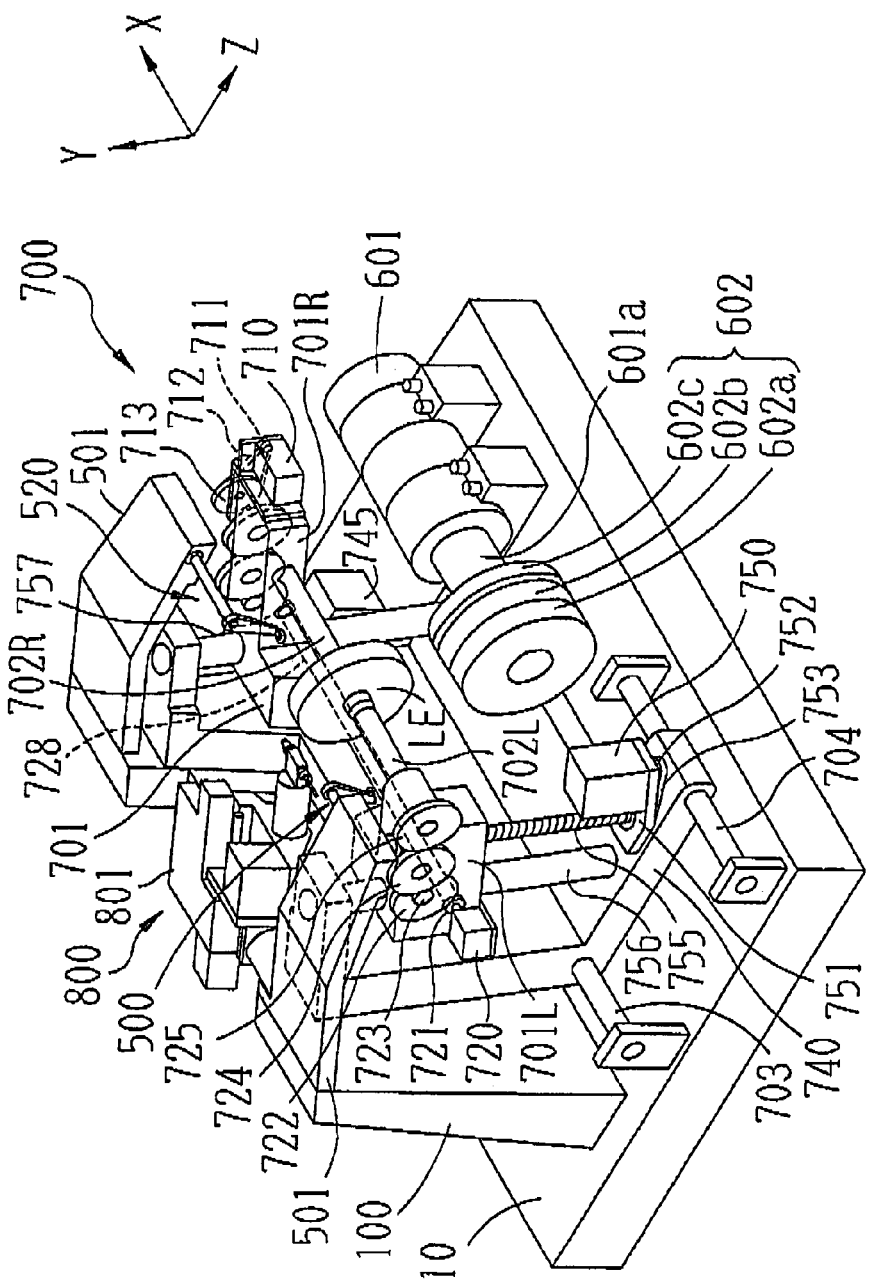
FIG. 2 is a schematic view showing a structure of a lens processing portion.

FIG. 2 is a schematic view showing a structure of a lens processing portion disposed in the processing apparatus 1. A carriage portion 700 including a carriage 701 and a moving mechanism thereof is mounted on a base 10. A lens LE to be processed is held (chucked) by lens chucks 702L and 702R which are held rotatably on the carriage 701 and is thus rotated, and is subjected to grinding by a grindstone 602. The grindstone 602 according to the embodiment includes a roughing grindstone 602a for a glass lens, a roughing grindstone 602b for a plastic lens, and a bevel-finishing and flat-finishing grindstone 602c. A grindstone spindle 601a having the grindstone 602 attached thereto is coupled to a grindstone rotating motor 601.

The lens chucks 702L and 702R are held by the carriage 701 in such a manner that central axes thereof (a rotating central axis of the lens LE) are parallel with a central axis of the grindstone spindle 601a (a rotating central axis of the grindstone 602). The carriage 701 can be moved in a direction of the central axis of the grindstone spindle 601a (a direction of the central axes of the lens chucks 702L and 702R) (an X-axis direction), and furthermore, can be moved in an orthogonal direction to the X-axis direction (a direction in which a distance between the central axes of the lens chucks 702L and 702R and the central axis of the grindstone spindle 601a is changed) (a Y-axis direction).

<Lens Holding (Chucking) Mechanism>

The lens chuck 702L and the lens chuck 702R are held on a left arm 701L and a right arm 701R of the carriage 701 rotatably and coaxially, respectively. A lens holding (chucking) motor 710 is fixed to the right arm 701R, and a rotation of the motor 710 is transmitted to a feed screw (not shown) coupled to a pulley 713 through a pulley 711 attached to a rotating shaft of the motor 710, a belt 712, and the pulley 713, and a feed nut (not shown) into which the feed screw is screwed is moved in an axial direction thereof by a rotation of the feed screw and the lens chuck 702R coupled to the feed nut is moved in an axial direction thereof by the movement of the feed nut. Consequently, the lens chuck 702R is moved in such a direction as to approach the lens chuck 702L, so that the lens LE is held (chucked) by the lens chucks 702L and 702R.

<Lens Rotating Mechanism>

A lens rotating motor 720 is fixed to the left arm 701L, and a rotation of the motor 720 is transmitted to the lens chuck 702L through a gear 721 attached to a rotating shaft of the motor 720, a gear 722, a gear 723 which is coaxial with the gear 722, a gear 724, and a gear 725 attached to the lens chuck 702L, so that the lens chuck 702L is rotated. Moreover, the rotation of the motor 720 is transmitted to the lens chuck 702R through a rotating shaft 728 coupled to the rotating shaft of the motor 720 and the same gears as the gears 721 to 725, so that the lens chuck 702R is rotated. Consequently, the lens chucks 702L and 702R are rotated synchronously so that the held (chucked) lens LE is rotated.

<X-axis Direction Moving Mechanism of Carriage 701>

A moving support base 740 is movably supported on guide shafts 703 and 704 fixed in parallel with each other over the base 10 and extended in the X-axis direction. Moreover, an X-axis direction moving motor 745 is fixed onto the base 10, and a rotation of the motor 745 is transmitted to the support base 740 through a feed screw (not shown) coupled to a rotating shaft of the motor 745, so that the support base 740 is moved in the X-axis direction. Consequently, the carriage 701 supported on guide shafts 756 and 757 fixed to the support base 740 is moved in the X-axis direction.

<Y-Axis Direction Moving Mechanism of Carriage 701>

The carriage 701 is movably supported on the guide shafts 756 and 757 fixed to the support base 740 in parallel and extended in the Y-axis direction. Moreover, a Y-axis direction moving motor 750 is fixed to the support base 740 through a plate 751, and a rotation of the motor 750 is transmitted to a feed screw 755 coupled a pulley (not shown) and held rotatably on the plate 751 through a pulley 752 attached to a rotating shaft of the motor 750, a belt 753, and the pulley (not shown), so that the carriage 701 into which the feed screw 755 is screwed is moved in the Y-axis direction by a rotation of the feed screw 755.

Lens shape measuring portions 500 and 520 are disposed above the carriage 701. A drilling and grooving portion 800 is disposed behind the carriage 701.

Figure 3:
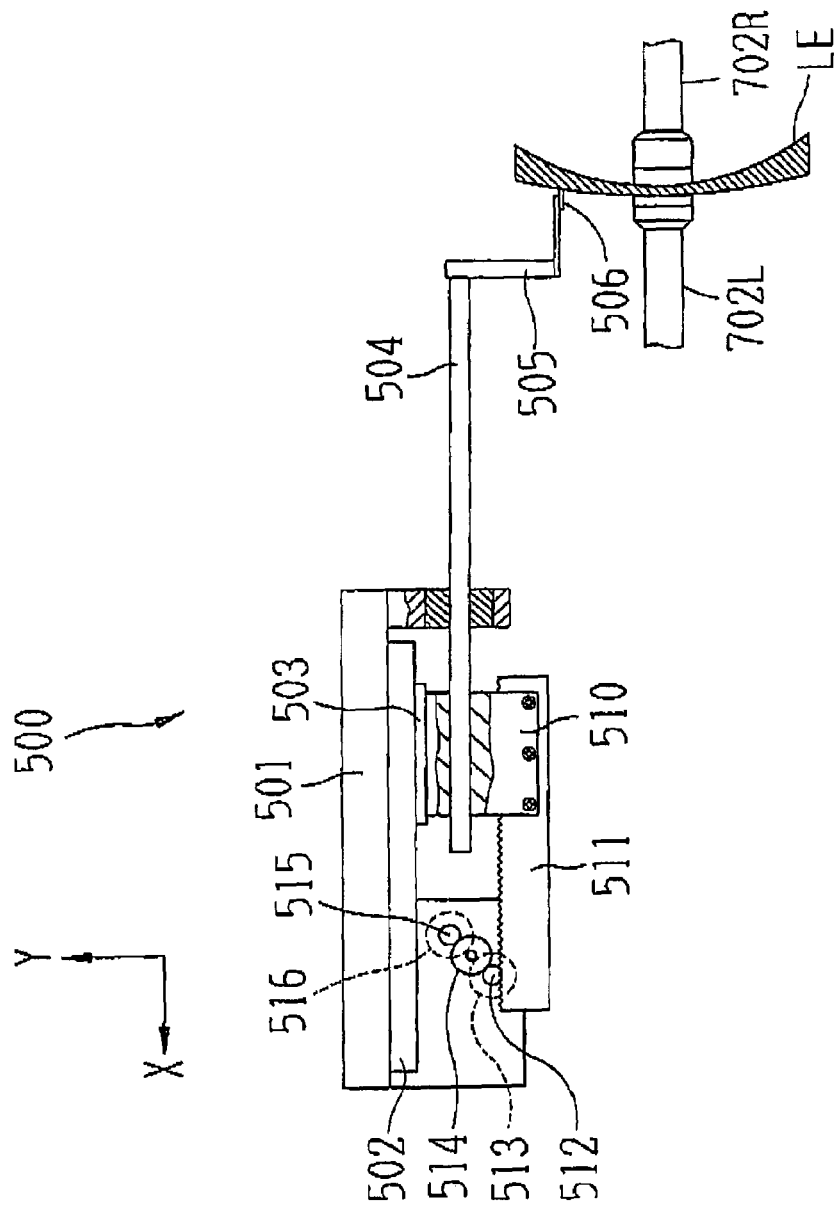
FIG. 3 is a schematic view showing a structure of a lens measuring portion.

FIG. 3 is a schematic view showing a structure of the lens measuring portion 500 for measuring a shape (a position of a edge) of a front refractive surface of the lens LE. A fixing support base 501 is fixed to a sub base 100 erected from the base 10 (see FIG. 2) and a slider 503 is movably supported on a guide rail 502 fixed to the support base 501 and extended in the X-axis direction. A moving support base 510 is fixed to the slider 503 and a feeler arm 504 is fixed to the support base 510. An L-shaped feeler hand 505 is fixed to a tip of the arm 504 and a disc-shaped feeler 506 is attached to a tip of the hand 505. When measuring the shape of the front refractive surface of the lens LE, the feeler 506 is caused to abut on the front refractive surface of the lens LE.

A rack gear 511 is fixed to a lower part of the support base 510, and a gear 512 attached to a rotating shaft of an encoder 513 fixed to the support base 501 is engaged with the rack gear 511. Moreover, a lens shape measuring motor 516 is fixed to the support base 501 and a rotation of the motor 516 is transmitted to the rack gear 511 through a gear 515 attached to a rotating shaft of the motor 516, a gear 514, and the gear 512, so that the rack gear 511, the support base 510, and the arm 504 are moved in the X-axis direction. During the measurement, the motor 516 always causes the feeler 506 to be pushed against the front refractive surface of the lens LE by a certain force. The encoder 513 detects an amount of the movement in the X-axis direction of the support base 510 (a position of the feeler 506). The shape of the front refractive surface of the lens LE is measured by the amount of the movement (the position) and rotating angles of the lens chucks 702L and 702R.

Since the lens measuring portion 520 for measuring a shape (a position of a edge) of a rear refractive surface of the lens LE is laterally symmetrical about the lens measuring portion 500, description of a structure thereof will be omitted.

Figure 4:
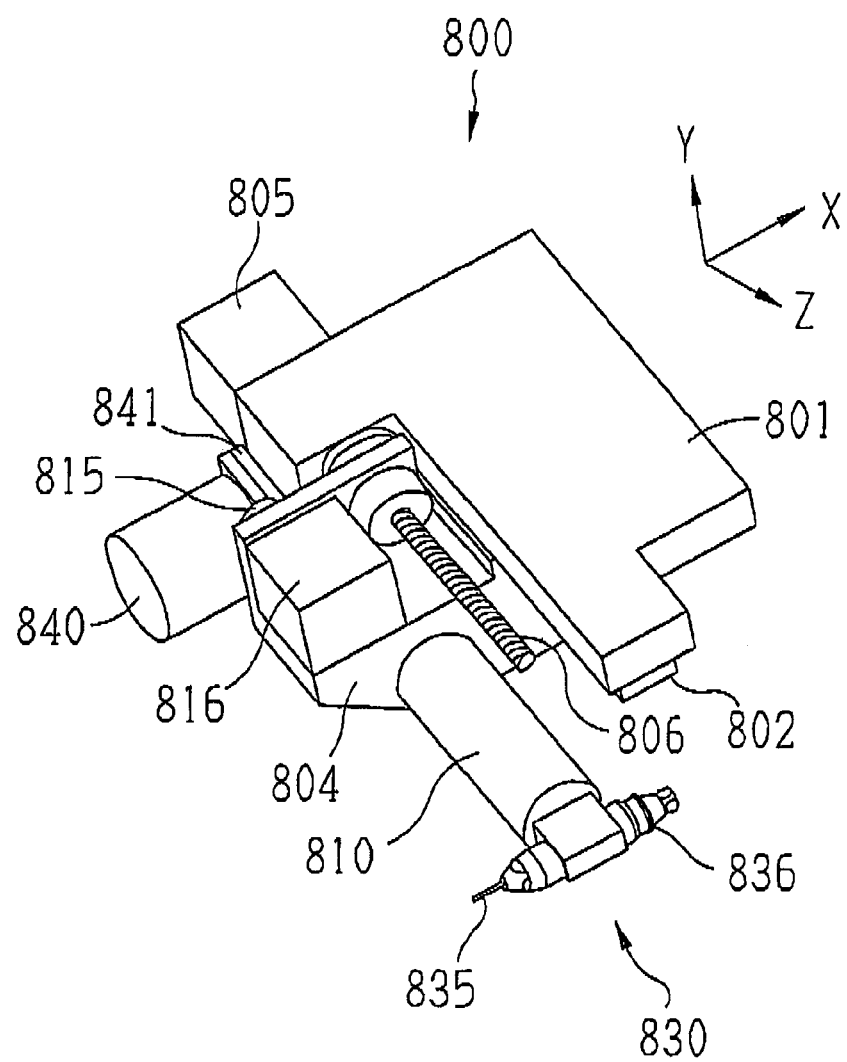
FIG. 4 is a view showing an appearance of a schematic structure of a drilling and grooving portion.
Figure 5:
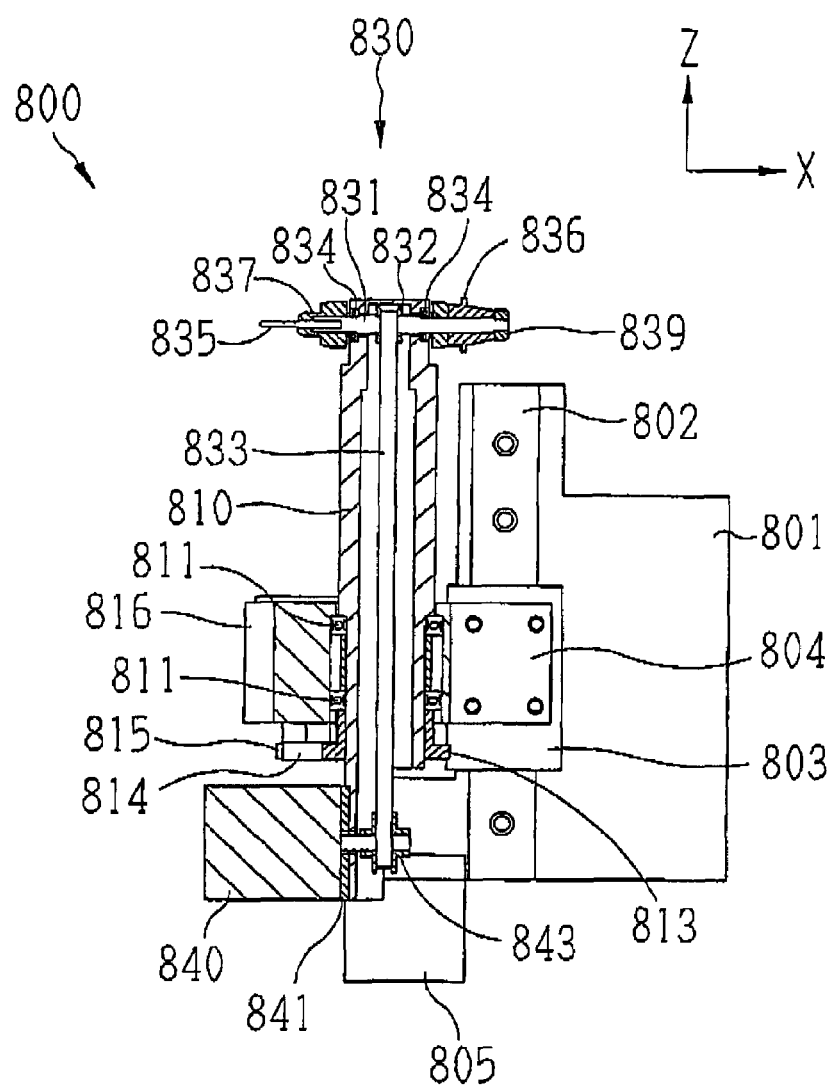
FIG. 5 is a sectional view showing the schematic structure of the drilling and grooving portion.

FIGS. 4 and 5 are schematic views showing a structure of the drilling and grooving portion 800. A fixing support base 801 to be a base of the portion 800 is fixed to the sub base 100 (see FIG. 2), and a slider 803 is movably supported on a guide rail 802 fixed to the support base 801 and extended in a Z-axis direction (an orthogonal direction to an XY-axis plane). A moving support base 804 is fixed to the slider 803, and a feed screw 806 coupled to a rotating shaft of a Z-axis direction moving motor 805 is screwed into the support base 804. The feed screw 806 is rotated by a rotation of the motor 805 fixed to the support base 801, so that the support base 804 is moved in the Z-axis direction.

A rotating support base 810 is rotatably supported pivotally on the support base 804 through a bearing 811, and a gear 813 is fixed to the support base 810 on either side of the bearing 811. A holder rotating motor 816 is fixed to the support base 804, and a rotation of the motor 816 is transmitted to the support base 810 through a gear 815 attached to a rotating shaft of the motor 816, a gear 814, and the gear 813, so that the support base 810 is rotated around an central axis of the bearing 811.

A processing tool holder 830 for holding a processing tool is provided on a tip of the support base 810. The holder 830 is moved in the Z-axis direction by a movement of the support base 804 executed by the motor 805 and is rotated by the rotation of the support base 810 executed by the rotation of the motor 816. A rotating shaft 831 is rotatably held pivotally on the holder 830 through two bearings 834 and has one end of the shaft 831 to which an end mill 835 to be a drilling tool is attached through a chuck portion 837 and the other end thereof to which a grooving grindstone 836 to be a grooving tool is attached through a nut 839. For the grooving tool, a cutter may be used in place of the grindstone.

An end mill and grindstone rotating motor 840 are fixed to the support base 810 through a plate 841, and a rotation of the motor 840 is transmitted to the shaft 831 through a pulley 843 attached to a rotating shaft of the motor 840, a belt 833, and a pulley 832 attached to the shaft 831, so that the shaft 831 is rotated. Consequently, the end mill 835 and the grindstone 836 are rotated.

Figure 6:
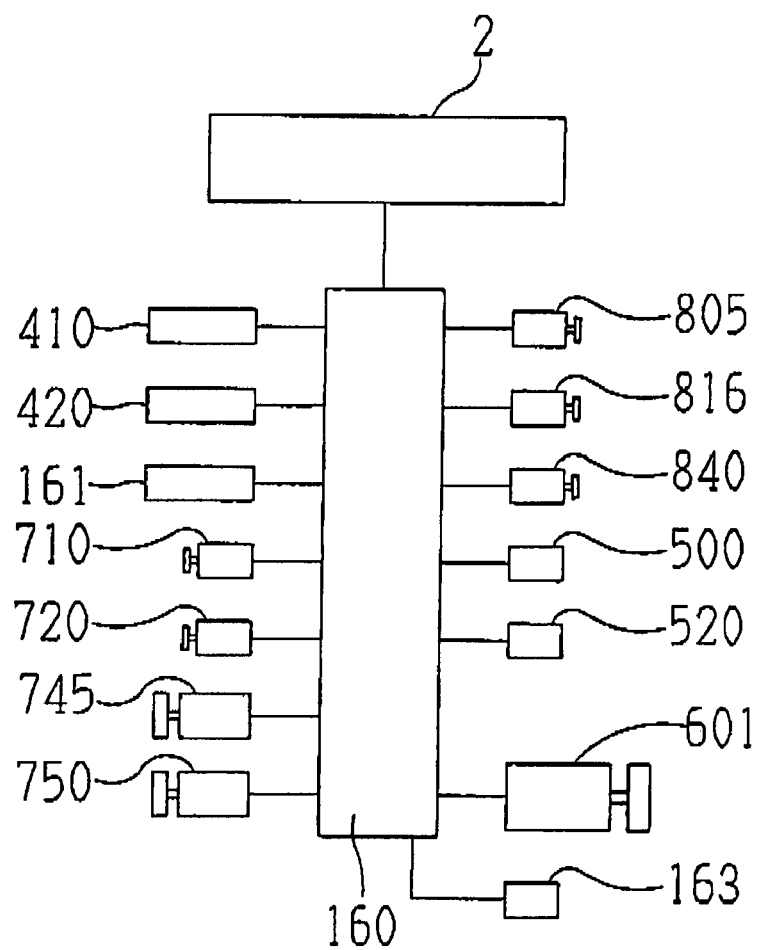
FIG. 6 is a schematic block diagram showing a control system of the eyeglass lens processing apparatus.

Referring to an operation of the apparatus having the structure, the drilling for attaching a rimless frame to the lens LE will be mainly described with reference to a schematic block diagram showing a control system in FIG. 6.

First of all, shapes of left and right rims of the frame are measured by the measuring device 2, so that data on a target lens shape are obtained. In case of the rimless frame, a shape of a template (pattern), that of a demo lens (model lens) and the like are measured, so that the target lens shape data thereof are obtained. The target lens shape data which is transferred from the measuring device 2 is input by pressing a communication button displayed on the touch panel 410, is converted to vector data (Rn, θn) (n=1, 2, ..., N) based on a geometric center of the target lens shape, and is stored in a memory 161. Incidentally, Rn indicates a vector length and θn indicates a vector angle. When the target lens shape data are input, a target lens shape graphic based on the target lens shape data is displayed on a screen of the touch panel 410. An operator operates a button displayed on the touch panel 410 with the stylus pen 430 or the like to input layout data such as an FPD (a frame papillary distance) of the frame, a PD (a papillary distance) of a user, and a height of an optical center of the lens LE with respect to the geometric center of the target lens shape. Moreover, the operator sets (inputs) the rimless frame (the two-point frame) as a type of the eyeglass frame. When an input operation of the hole data is set on a menu screen, a hole data input screen on which the hole data can be input is displayed on the touch panel 410. The touch panel 410 is controlled by an arithmetic control portion 160. The target lens shape data may be input from a database (not shown) or the like.

Figure 7:
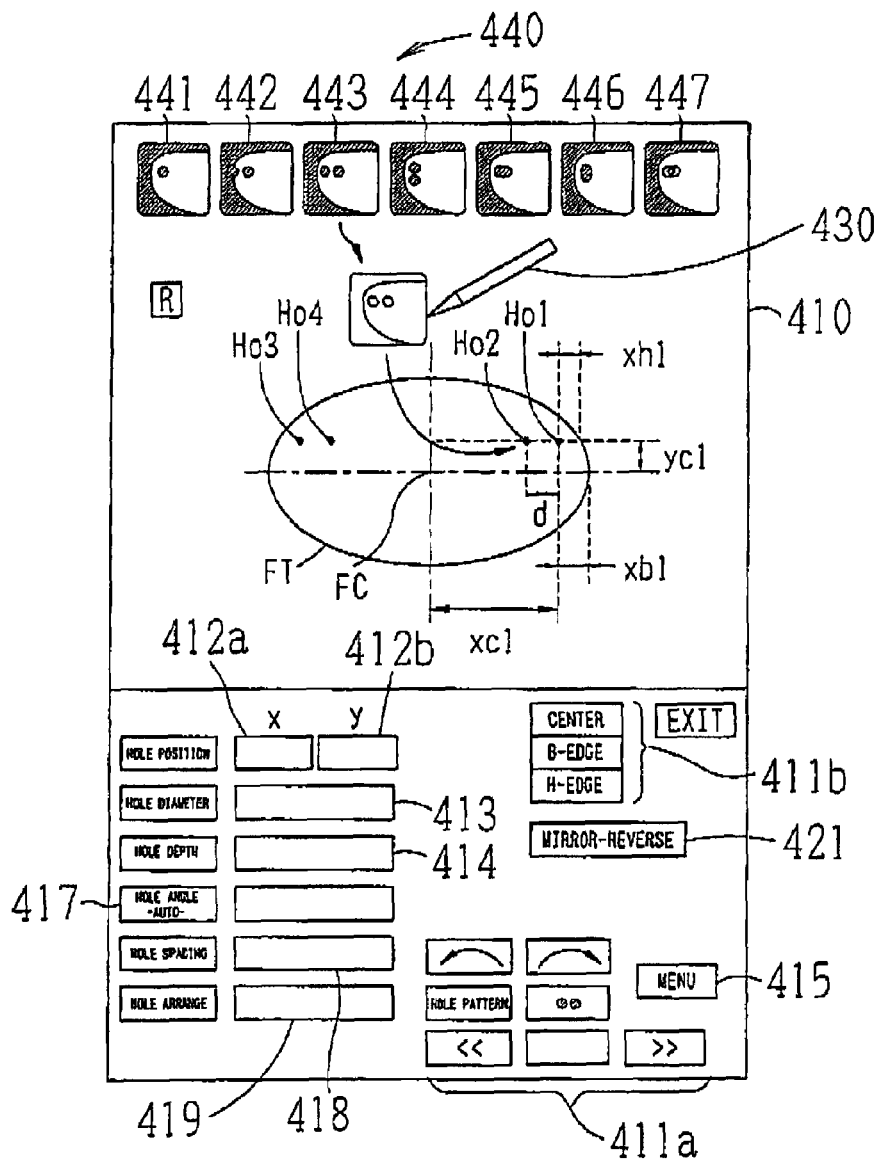
FIG. 7 is a view showing an example of a hole data input screen displayed on a touch panel.

FIG. 7 is a view showing an example of the hole data input screen displayed on the touch panel 410. Reference numeral FC indicates the geometric center of the target lens shape (the target lens shape graphic) FT. Reference numeral 440 indicates a hole pattern icon. The icon 440 includes an icon 441 of one circular through-hole pattern, an icon 422 of a pattern in which one notch and one circular through hole are combined (arranged), an icon 443 of a pattern in which two circular through-holes are arranged in a horizontal direction, an icon 444 of a pattern in which two circular through-holes are arranged in a vertical direction, an icon 445 of one horizontally long through-hole pattern, an icon 446 of one vertically long through-hole pattern, and an icon 447 of a pattern in which a counter-bore hole is disposed around one circular through-hole. A desired icon (a desired hole pattern) is selected from plural types of icons (hole patterns) 440 and is reflected to the target lens shape, so that the hole data with respect to the target lens shape data is input. The icon (the hole pattern) 440 includes icons (hole patterns) having a high usage frequency and is stored in a memory 163.

Description will be given by taking, as an example, the case in which two circular through-holes are formed on each of both a nose side and an ear side of a front refractive surface of a lens for a right eye in attaching the frame to the lens. When the icon 443 is selected (clicked) with the stylus pen 430 and is moved (dragged and dropped) to the position Ho1 of the nose side within the target lens shape graphic FT, a first hole is set at a position Ho1 and a second hole is set at a position Ho2 near thereby. As described above, when the icon 443 (of the pattern in which two through-holes are arranged in the horizontal direction) is selected, the position of one hole is designated, so that the position of the other hole arranged next thereto is automatically designated. That is, the positions of two holes arranged in the horizontal direction are simultaneously designated (set) by the arithmetic control portion 160 serving as setting means. Since the nose side and the ear side generally have the same hole pattern in the rimless frame, a third hole is set at a position Ho3 of the ear side within the target lens shape graphic FT and a fourth hole is set at a position Ho4 near thereby by setting the position Ho1 of the nose side. The hole position Ho3 of the ear side is set in accordance with the hole position Ho3 of the nose side (for example, so that the hole position Ho1 has the same distance from the edge of the target lens shape rim as the hole position Ho1) and the hole position Ho4 of the ear side is set in accordance with the hole position Ho2 of the nose side (for example, so that the hole position Ho4 has the same distance from the edge of the target lens shape rim as the hole position Ho4). As described above, when the icon 443 is selected, the position of any one of the hole of the nose side and the ear side is designated, so that the position of the other hole is automatically designated. That is, the positions of both of the holes of the nose side and the hole of the ear side are simultaneously designated (set) by the arithmetic control portion 160. Moreover, when the icon 443 is selected, the plural hole positions of any one of the nose side and the ear side is simultaneously designated (set), but the plural hole positions of both of the nose side and the ear side may not be simultaneously designated (set). Even when the icon 442 (the pattern in which one notch and one circular through-hole are arranged) and the icon 444 (the pattern in which two circular through-holes are arranged in the vertical direction), the hole positions are designated in the same manner as the case when the icon 443 is selected. Even though the hole position Ho1 is set as a reference position, any one of the other hole positions Ho2 to Ho4 may be set as the reference position. A middle position between the hole positions Ho1 and Ho2, a middle position between the hole positions Ho3 and Ho4, a middle position between the hole positions Ho1 and Ho3, and a middle position between the hole positions Ho2 and Ho4 also may be set as the reference position.

When a mirror inversion mode of the target lens shape is selected by a button 421, hole positions in a lens for a left eye are automatically (simultaneously) set in the same as in the lens for the right eye.

The hole positions are designated by an orthogonal coordinate system in which the horizontal direction is generally set as the x axis and the vertical direction is set as a y axis at the time of attaching the frame to the lens based on the target lens shape center FC. Therefore, the orthogonal coordinate system is also used as an example of an orthogonal coordinate system in FIG. 7 (the x axis and the y axis are different from the X axis and the Y axis of the lens processing portion). The positions of the stylus pen 430 moving the icon 440 is sequentially displayed an x-axis position column 412a and a y-axis position column 412b. Accordingly, it is possible to designate the hole position with reference to the displayed position. When the icon 443 is selected, a coordinate of the reference position (the hole position Ho1 described above) is displayed the column 412a and the column 412b. According to an embodiment, in a method of displaying the position on the x axis, the position on the x axis may be selected from a size xc1 (based on a center) from the target lens shape center FC, a size xb1 (based on a B-edge) from an edge of the nose side or the ear side of the target lens shape, and a size xh1 (based on a H-edge) from an edge of the nose side or the ear side near the holes by a button 411b. In a method of displaying the position on the y axis, the position on the y axis is selected only from a size yc1 (based on the center) from the target lens shape center FC, but may be selected in the same manner as in the method of displaying the position on the x axis (for example, a size from an edge of the upper side or lower side of the target lens shape).

When the hole position is adjusted after the hole position is designated (set) by moving the icon 440, the hole position is adjusted (input) by numeric keypads displayed by pressing the columns 412a and 412b.

When a hole diameter at the reference position (the hole position Ho1 described above) is input by the numeric keypads displayed by pressing a hole diameter column 413, a diameter of the other hole is automatically (simultaneously) set by the arithmetic control portion 160. When the hole diameter is not input into the column 413, a reference hole diameter based on the selected hole pattern is set. When a hole depth at the reference position (the hole position Ho1 described above) is input by the numeric keypads displayed by pressing a hole depth column 414, a depth of the other hole is automatically (simultaneously) set by the arithmetic control portion 160. When the hole depth of one hole is not input into the column 414, a reference hole depth based on the selected hole pattern is set.

An automatic drilling mode is designated by a hole angle (direction) designating button 417 for a hole depth-directional angle (a hole depth-direction). Then, when the hole pattern in which one hole is formed at any one or both of the nose side and the ear side is selected, the hole angle (the hole direction) is set so that the hole is formed in a direction (a normal direction) orthogonal to the front refractive surface of the lens LE at each hole position by the arithmetic control portion 160 and when the hole pattern in which plural holes are arranged at any one or both of the nose side and the ear side is selected, the hole angle (the hole direction) is set so that the hole is formed in a direction (a normal direction) orthogonal to the front refractive surface of the lens LE at a middle position between the two arranged hole positions by the arithmetic control portion 160.

When the hole pattern in which the plurality of holes are arranged at any one or both of the nose side and the ear side is selected, a hole interval input column 418 is displayed. Therefore, when a hole interval is input by the numeric keypads displayed by pressing the column 418, an arranging interval of the plural holes are set (changed) by the arithmetic control portion 160. When the hole interval is not input into the column 418, a reference hole arranging interval based on the selected hole pattern is set.

Figure 8:
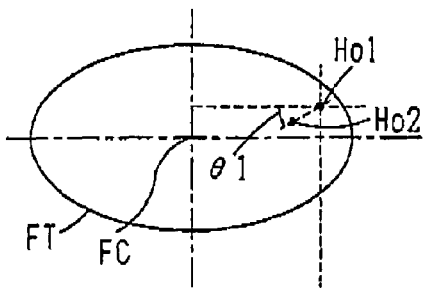
FIG. 8 is a view showing a setting of a hole position.

When the hole pattern in which the plural holes are arranged at any one or both of the nose side and the ear side is selected, a hole arrangement column 419 is displayed. Therefore, when a rotation angle θ1 is input by the numeric keypads displayed by pressing the column 419, an arrangement angle (an arrangement direction) of the plural holes is set (changed) by the arithmetic control portion 160 as shown in FIG. 8. In FIG. 8, the position Ho1 of an outer hole of the two holes arranged in the horizontal direction serves as the reference position, but the position Ho2 of an inner hole may serve as the reference position. In addition, the positions of two holes arranged in the vertical direction may serve as the reference arrangement. When the rotation angle θ1 is not input into the column 419, the holes are arranged in the horizontal direction or in the vertical direction based on the selected hole pattern.

The positions, diameters, depths, angles (directions), arranging intervals, and arrangement angles (arrangement directions) of the holes may be input before the reference position (the hole position Ho1 described above) is designated (input). Particularly, since the hole arranging intervals influence on an automatic (simultaneous) designation (input) of the hole positions, the hole arranging intervals are preferably input before the reference position is designated (input). The input hole data is stored in the memory 161.

The plural hole positions can be separately input by designating hole numbers with a button 411a. It is preferable that an automatic (simultaneous) setting function is changed to an 'off' state on a menu screen displayed by pressing a menu button 415 so as to stop the automatic (simultaneous) setting function of the hole position or the like.

In the above-mentioned embodiments, the hole positions are designated (input) by moving (dragging and dropping) the icons 440, but may be not limited thereto. For example, the hole positions may be designated (input) by designating a desired position within the target lens shape graphic FT after selecting any one of the icons 440. The pointing device is not limited to the touch panel, but may include a combination of a monitor and a mouse of a PC (Personal Computer), which is widely known. The pointing device may include a device in which the display portion and the input portion are separately constructed.

When necessary data such as the hole data can be input, the lens LE is held (chucked) by the lens chucks 702L and 702R and the processing start switch of the switch portion 420 is pressed down to operate the apparatus. The arithmetic control portion 160 controls the lens measuring portions 500 and 520 based on the target lens shape data which is input and measures the shape of the lens LE. The arithmetic control portion 160 drives the motor 516 to position the arm 504 from a retracting position to a measuring position and then drives the motor 750 to move the carriage 701 in the Y-axis direction based on the vector data of the target lens shape (Rn, θn) (n=1, 2, . . . , N), and furthermore, drives the motor 516 to move the arm 504 toward the lens LE side (a direction approaching the lens LE side), so that the feeler 506 abuts on the front refractive surface of the lens LE. In a state in which the feeler 506 abuts on the front refractive surface, the motor 750 is driven to move the carriage 701 in the Y-axis direction in accordance with the vector data while the motor 720 is driven to rotate the lens LE. With the rotation and movement of the lens LE, the feeler 506 is moved in the direction of the central axes of the lens chucks 702L and 702R (the X-axis direction) along the front refractive surface shape of the lens LE. The amount of the movement is detected by the encoder 513 and the front refractive surface shape of the lens LE (Rn, θn, zn) (n=1, 2, . . . , N) is measured. zn indicates a height (thickness) of the front refractive surface of the lens LE. The rear refractive surface shape of the lens LE is also measured by the lens measuring portion 520. Data on the front and rear refractive surface shapes of the lens LE thus measured are stored in the memory 161.

The position of the front edge corresponding to the hole positions (including the middle position between two holes) and the position of the front edge located outer than the hole positions by a predetermined distance are measured, so that an inclination angle α1 of the front refractive surface of the lens LE is obtained.

Figure 9A:
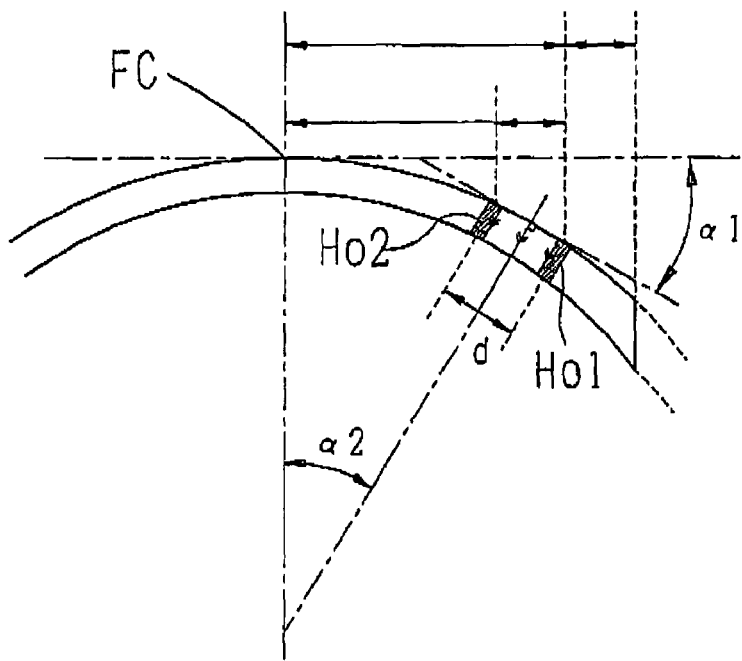
FIGS. 9A and 9B are views showing a calculating of a hole angle (a hole direction) and a processing of forming a hole based on the calculated hole angle.

When the automatic drilling mode is designated, the arithmetic control portion 160 obtains an inclination angle α2 to the rotating central angle of the lens LE (the central axes of the lens chucks 702L and 702R) in the direction (the normal direction) orthogonal to the front refractive surface of the lens LE at the hole position (the middle position between two holes) based on the obtained inclination angle α1 as shown in FIG. 9A. As shown in FIG. 9A, an arranging interval d of two holes is set so as not to be an interval on a plane orthogonal to the rotating central axis of the lens LE, but so as to be an interval on a plane orthogonal in the normal direction.

The arithmetic control portion 160 obtains drilling data based on the measuring result and the input hole data. The drilling data includes rotation data of the lens LE, moving data of the carriage 701 in the X- and Y-axis directions, moving data of the portion 800 in the Z-direction, and rotation data of the holder 830. The arithmetic control portion 160 obtains peripheral edge processing data including roughing data and finishing data on the basis the measuring result.

The arithmetic control portion 160 moves the carriage 701 in the X-axis direction by driving the motor 745 so as to position the lens LE on the roughing grindstone 602b. Then, the arithmetic control portion 160 rotates the lens LE by driving the motor 720 and moves the carriage 701 in the Y-axis direction by driving the motor 750 to rough the lens LE based on the roughing data. Next, the arithmetic control portion 160 moves the carriage 701 in the X-axis direction so as to position the lens LE on a flat part of the finishing grindstone 602c. Then, the arithmetic control portion 160 rotates the lens LE and moves the carriage 701 in the Y-axis direction to flat-finishing the lens LE based on the finishing data.

Figure 9B:
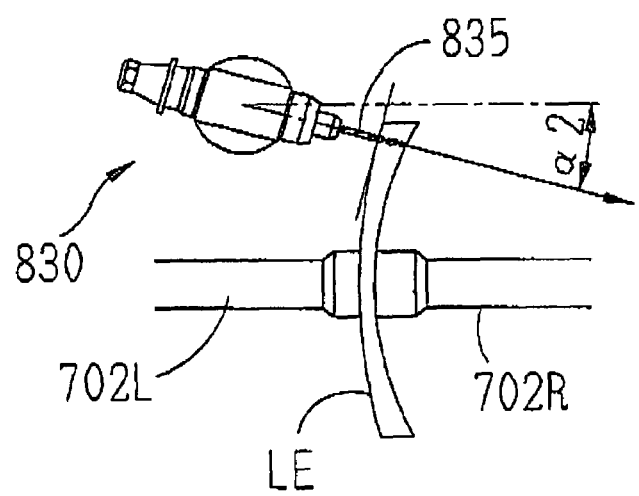

When the peripheral edge processing of the lens LE is completed, the processing proceeds to the drilling. In the case in which holes are formed in the hole positions Ho1 and Ho2 in parallel with the orthogonal direction to the lens front refractive surface (the normal direction) of the lens LE, the hole angle α2 is obtained in a middle position between the hole positions Ho1 and Ho2 as shown in FIG. 9A. As shown in FIG. 9B, the arithmetic control portion 160 inclines a rotating central axis of the end mill 835 with respect to the rotating central axis direction of the lens LE by the angle α2 by driving the motor 816 to rotate the holder 830, and furthermore, controls the rotation of the lens LE by driving the motor 720 and the movement in the X- and Y-axis directions of the carriage 701 by driving the motors 745 and 750, and places the tip of the end mill 835 in the hole position Ho1. Then, the end mill 835 is rotated by driving the motor 840, thereby moving the carriage 701 in the X- and Y-axis directions in the rotating central axis direction of the end mill 835 (the direction of the angle α2). Thus, the drilling is executed. Referring to another hole position Ho2, similarly, the tip of the end mill 835 is placed in the hole position Ho2 with the angle α2, thereby carrying out the drilling in the same manner.

Figure 10A:
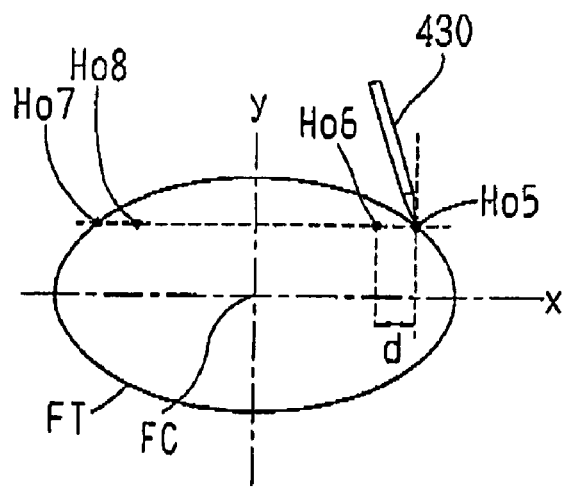
FIGS. 10A and 10B are views showing a setting of the hole position.
Figure 10B:
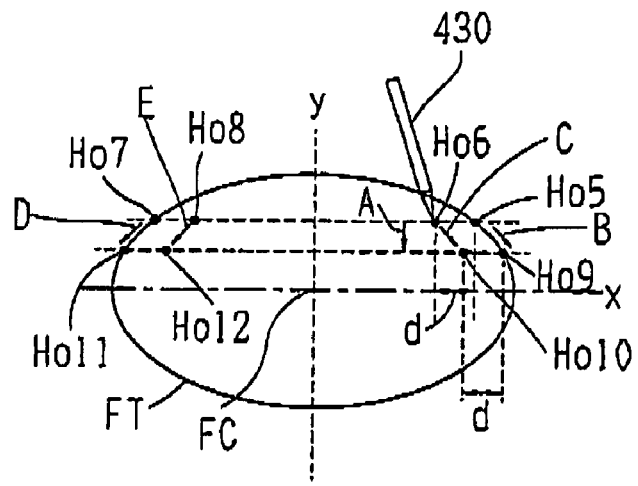

Next, there will be described a case in which one notch and one circular through-hole are formed at both the nose side and the ear side of the front refractive surface of the lens for the right eye. When the icon 442 is selected, thereby the reference position (a hole position Ho5 in this embodiment) is designated, the other hole positions Ho6 to Ho8 are automatically (simultaneously) designated (set) in the same manner as described above (see FIG. 10A). A hole interval between the hole positions Ho5 and Ho6 making a set with the hole position Ho5 (a hole interval between the hole positions Ho7 and Ho8) is also shown in d. When any one (the hole position Ho6 in this embodiment) of the hole positions Ho5 to Ho8 is selected with the stylus pen 430 and is moved in a direction of an arrow A (only in the Y-axis direction), the hole position Ho5 is automatically moved along the edge of the target lens shape in a direction of an arrow B to form a hole position Ho9 and the hole position Ho6 is automatically moved in a direction of an arrow C parallel to the direction of the arrow B to form a hole position Ho10. The hole position Ho7 at an opposite side thereof is automatically moved along the edge of the target lens shape in a direction of an arrow D to form a hole position Ho11 and the hole position Ho8 is automatically moved in a direction of an arrow E parallel to the direction of the arrow D to form a hole position Ho12 (see FIG. 10B). As described above, since the icon 442 is selected, so that the hole positions Ho5 and Ho7 of the notch are certainly on the edge of the target lens shape, the hole positions Ho5 and Ho7 are not moved on the edge of the target lens shape. The hole positions Ho6 and Ho8 of the circular hole making a set with the notch also move while maintaining the hole interval d between the hole positions Ho5 and Ho7.

The control is not limited to the combination pattern of the notch and one circular through-hole. For example, in one circular through-hole pattern, the hole position may not be moved inwardly from the edge of the target lens shape by a set distance or more when the hole position is moved in the direction (only in the Y-axis direction) of the arrow A.

Although it is described above that the through-hole is formed, the control can be executed when a nonthrough-hole such as a counter-bore hole is formed.

Next, a case in which the hole angle (the hole direction) set to be orthogonal to the front refractive surface of the lens LE is modified (adjusted) in the automatic drilling mode will be described with reference to FIGS. 11 to 13 (one circular through-hole pattern). First of all, the hole positions with respect to the target lens shape (the target lens shape graphic) FT are designated. When the icon 441 is selected with the stylus pen 430 and is moved to the hole position Ho1 of the nose side within the target lens shape graphic FT, a first hole is set at the hole position Ho1 and a second hole is set at the hole position Ho2 of the ear side (see FIG. 11).

The automatic drilling mode is designated (selected) with the button 417. In a step in which the automatic drilling mode is designated (selected), since the hole angle (the hole direction) is not known, the hole angle is not displayed in a hole angle column 417a (see FIG. 11).

Figure 11:
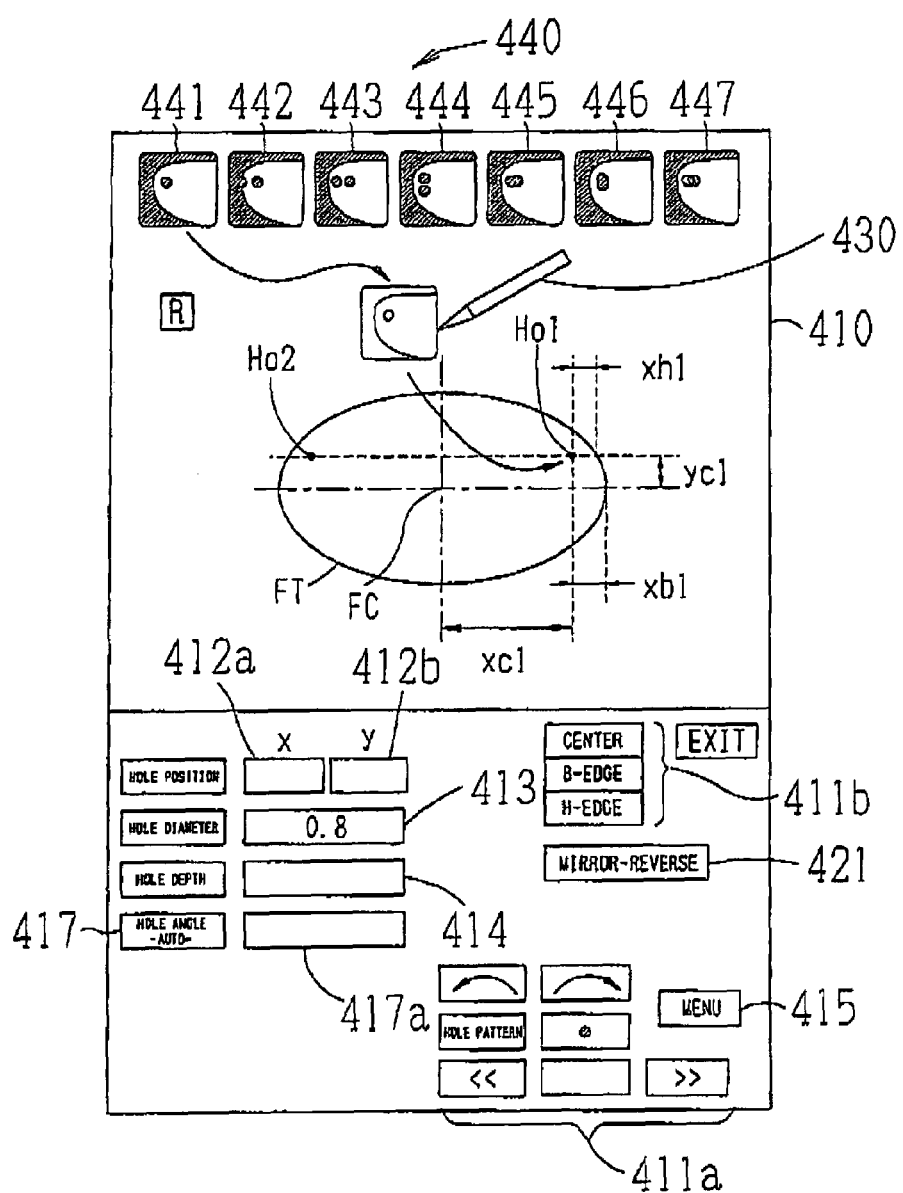
FIG. 11 is a view showing an example of the hole data input screen displayed on the touch panel.

0.8 mm which is a diameter of the end mil 835 serving as a diameter of a temporary hole is input into the hole diameter column 413 so that a real hole is formed after the temporary hole is formed and an attachment state of the rimless frame is verified (see FIG. 11).

When the processing start switch is pressed, the peripheral edge processing and the drilling of the lens LE are executed, similarly. The arithmetic control portion 160 obtains the inclination angle $\alpha 1$ of the front refractive surface of the lens LE at the hole position (the inclination angle at the hole position Ho1 in this embodiment) based on the shape of the front refractive surface of the lens LE. The arithmetic control portion 160 obtains the hole angle $\alpha 2$ at the hole position Ho1 based on the obtained inclination angle $\alpha 1$. The inclination angle $\alpha 1$ may be manually input by the touch panel 410 and may be input from an external device.

When the temporary hole is formed, the lens LE is removed from the lens chucks 702L and 702R, thereby verifying whether the temporary hole is matched with the frame. When the lens LE is held (chucked) by the lens chucks 702L and 702R and a retouch switch (mode selecting means) of the switch portion 420 is pressed, a reprocessing mode is executed, so that a menu screen for a reprocessing operation is displayed on the touch panel 410.

Figure 12:
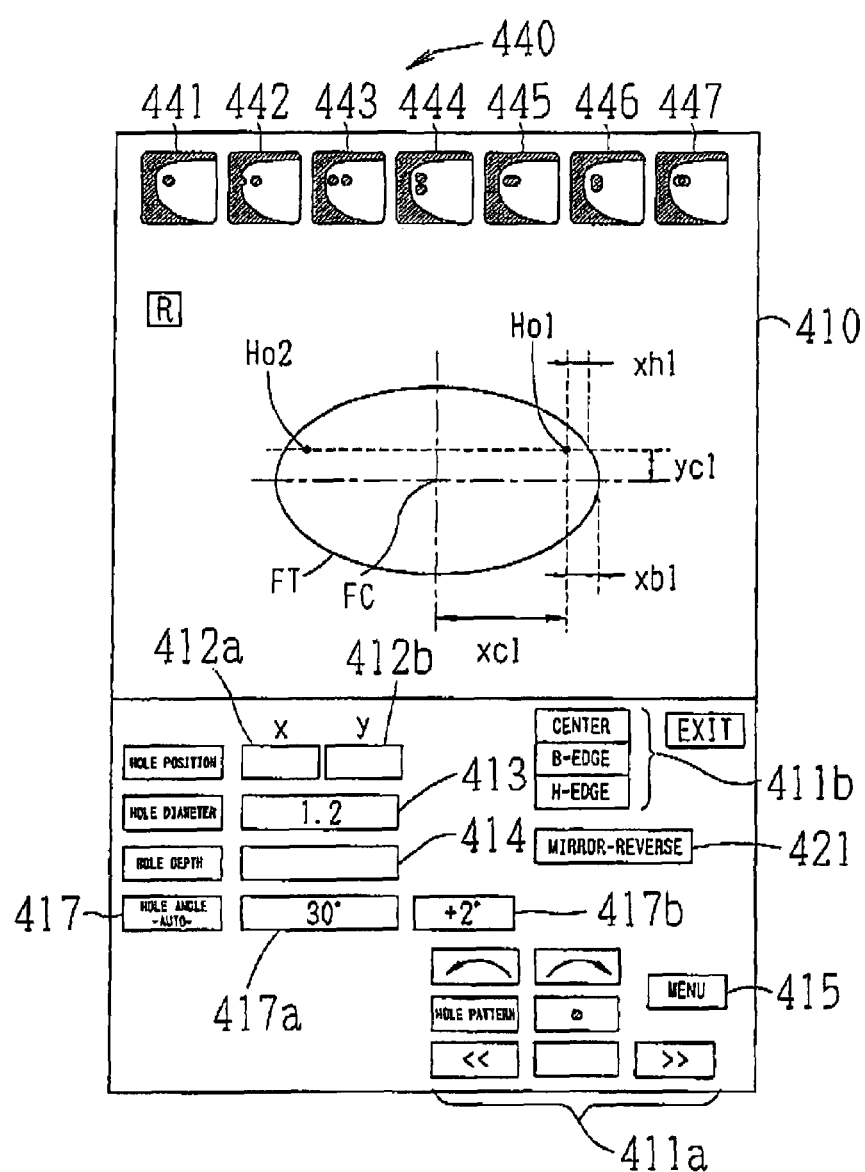
FIG. 12 is a view showing an example of the hole data input screen displayed on a touch panel.
Figure 13:
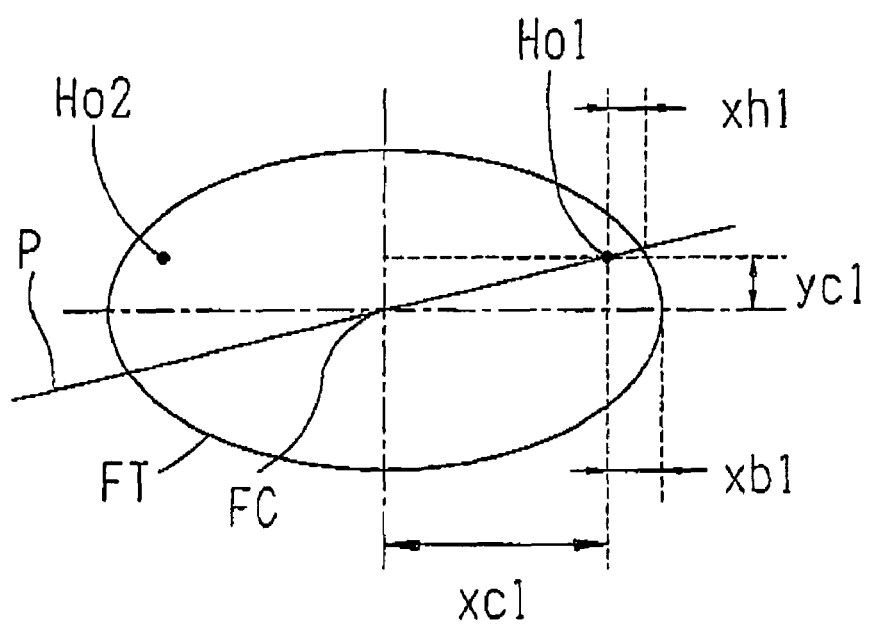
FIG. 13 is a view showing a modifying of the hole angle (the hole direction).

When a hole data adjusting (inputting) operation of the hole data is selected on the menu screen for the reprocessing operation, a hole data input screen for the reprocessing operation is displayed (see FIG. 12). The drilling data and the hole data including the inclination angle $\alpha 1$ and the hole angle $\alpha 2$ before the reprocessing operation are stored in the memory 161 in the reprocessing mode and are displayed on the hole data input screen for the reprocessing operation. For example, the hole angle $\alpha 2$ set in the automatic drilling mode is displayed in the hole angle column 417a. The increased and decreased angles to the hole angle $\alpha 2$ are input by the numeric keypads displayed by pressing an modified hole angle column 417b, thereby modifying the hole angle $\alpha 2$. As shown in FIG. 13, the modification of the hole angle $\alpha 2$ is executed in a direction of a p-axis passing the reference point FC and a hole position to be modified (the hole position Ho1 in this embodiment), but the hole angle $\alpha 2$ may be modified in the x-axis direction, the y-axis direction, or a direction combining both directions.

The modified hole angle $\alpha 2$ (32° in an example of FIG. 12) may be input into the column 417b.

1.2 mm as a diameter of the real hole is input into the hole diameter column 413 (see FIG. 12). When the hole position, the hole depth, and the like need to be modified, the values are changed.

When the hole data for the reprocessing operation is input and the processing start switch is pressed again, the arithmetic control portion 160 controls the mechanisms so that the processing of the modified item is executed. When the hole angle is modified, the arithmetic control portion 160 obtains the rotation data of the lens LE, the moving data of the carriage 701 in the X- and Y-axis directions, the moving data of the portion 800 in the Z-direction, and the rotation data of the holder 830 based on the modified hole angle to execute the re-drilling on the basis thereof.

Description will be given by taking, for example, as the case in which the hole data input device including the touch panel, etc. is provided integrally with the eyeglass lens surrounding apparatus, but the invention is not limited to the case. For example, the hole data input device may be provided in an eyeglass frame measuring apparatus. Alternatively, the hole data input device may be provided in a peripheral apparatus used in relation with the eyeglass lens processing apparatus, such as a cup attaching apparatus attaching a cup serving as a processing jig to an eyeglass lens to be processed. Alternatively, the hole data input device may serve as a dedicated device. In the dedicated device, the hole data input (set) by the hole data input device is transmitted (output) to the eyeglass lens processing apparatus via communication means.

What is claimed is:

1. A hole data input device for inputting hole data including a position of a hole with respect to a target lens shape for forming the hole on an eyeglass lens to attach a rimless frame to the lens, the hole data input device comprising:
    a first storage that stores plural types of hole patterns;
    a selector that selects a desired hole pattern from the stored hole patterns;
    a second storage that stores target lens shape data;
    a display that displays a target lens shape graphic based on the stored target lens shape data;
    a hole position input unit that designates a reference position for positions of plural holes on the displayed target lens shape graphic;
    a setting unit that automatically sets the positions of the plural holes based on the selected hole pattern and the designated reference position; and
    a third storage that stores the set positions of the plural holes.

2. The hole data input device according to claim 1, wherein the hole position input unit designates a position of one hole among the plural holes as the reference position.

3. The hole data input device according to claim 1,
    wherein the selector selects an icon of the desired hole pattern from icons of the stored hole patterns, which are displayed on the display, and
    wherein the hole position input unit designates the reference position by moving the selected icon onto the target lens shape graphic.

4. The hole data input device according to claim 1 further comprising a hole interval input unit that inputs an interval between two holes among the plural holes,
    wherein the setting unit automatically sets a position of the other hole based on the selected hole pattern, the designated reference position, and the input hole interval.

5. The hole data input device according to claim 1 further comprising a hole diameter input unit that inputs a diameter of one hole among the plural holes,
    wherein the setting unit automatically sets a diameter of the other hole based on the selected hole pattern and the input hole diameter.

6. The hole data input device according to claim 1 further comprising a hole depth input unit that inputs a depth of one hole among the plural holes,
    wherein the setting unit automatically sets a depth of the other hole based on the selected hole pattern and the input hole depth.

7. The hole data input device according to claim 1 further comprising a hole angle input unit that inputs an angle of one hole among the plural holes,
   wherein the setting unit automatically sets an angle of the other hole based on the selected hole pattern and the input hole angle.

8. The hole data input device according to claim 1, wherein the setting unit automatically sets the positions of four holes when a hole pattern in which two holes are formed at each of a nose side and an ear side of the lens in attaching the frame to the lens is selected.

9. An eyeglass processing apparatus having the hole data input device according to claim 1, the eyeglass processing apparatus comprising:

a lens chuck holding the lens;

a drilling tool; and an arithmetic control portion executing a drilling of the lens by obtaining drilling data based on input hole data and controlling a positional relationship between the held lens and the drilling tool based on the obtained drilling data.

10. The hole data input device according to claim 1 further comprising a target lens shape input unit that inputs the target lens shape data, wherein the second storage stores the input target lens shape data.

* * * * *